(12) United States Patent
Rains

(10) Patent No.: US 6,836,992 B2
(45) Date of Patent: Jan. 4, 2005

(54) BIRD REPELLING DEVICE

(76) Inventor: Michael D. Rains, 2962 Mindanao Dr., Costa Mesa, CA (US) 92626

( * ) Notice: Subject to any disclaimer, the term of this patent is extended or adjusted under 35 U.S.C. 154(b) by 0 days.

(21) Appl. No.: 10/393,196

(22) Filed: Mar. 20, 2003

(65) Prior Publication Data

US 2004/0181991 A1 Sep. 23, 2004

(51) Int. Cl.$^7$ ............................................. A01M 29/00
(52) U.S. Cl. ................................. 43/1; 114/90; 52/101
(58) Field of Search ...................... 43/1, 124; 52/101; 114/90, 221 R; 119/57.9, 52.3, 903; 256/11; D22/119, 120; 84/422; 984/150; 231/4; 49/58; 116/22 A

(56) References Cited

U.S. PATENT DOCUMENTS

| | | | |
|---|---|---|---|
| 2,258,803 A | | 10/1941 | Peles |
| D133,037 S | | 7/1942 | Kraus |
| 2,304,593 A | | 12/1942 | Peles |
| 2,456,731 A | | 12/1948 | Peles |
| 2,475,047 A | * | 7/1949 | Peles ............................. 52/101 |
| 3,071,104 A | * | 1/1963 | McCandlish ............... 116/22 A |
| 3,150,555 A | * | 9/1964 | Sage ........................... 84/422.4 |
| 3,292,319 A | | 12/1966 | McCarthy |
| 3,365,108 A | * | 1/1968 | Giba ............................. 224/217 |
| 3,859,887 A | * | 1/1975 | Buchanan ................... 84/422.4 |
| 4,055,840 A | * | 10/1977 | Uchytil et al. .............. 340/321 |
| 4,144,832 A | * | 3/1979 | Dahl ........................... 116/22 A |
| 4,590,839 A | * | 5/1986 | Liedtke et al. ............. 84/422.4 |
| D297,546 S | * | 9/1988 | Seals ............................. D17/22 |
| 4,786,535 A | | 11/1988 | Young |
| 5,058,335 A | * | 10/1991 | Richter ......................... 52/101 |
| 5,181,338 A | | 1/1993 | Chatten |
| 5,370,030 A | * | 12/1994 | Horne ........................ 84/422.4 |
| 5,452,536 A | | 9/1995 | Chatten |
| 5,615,524 A | | 4/1997 | Costa, Sr. |
| 5,713,160 A | * | 2/1998 | Heron .......................... 52/101 |
| D404,107 S | | 1/1999 | Dimston |
| D414,528 S | * | 9/1999 | Bocock et al. ............. D21/400 |
| 5,974,998 A | | 11/1999 | Gregg, III |
| 2003/0182876 A1 | * | 10/2003 | Landers ....................... 52/101 |

FOREIGN PATENT DOCUMENTS

| | | | |
|---|---|---|---|
| EP | 0 806 139 A2 | 12/1997 | |
| JP | 08038023 A | * 2/1996 | .......... A01M/29/00 |
| JP | 2002101805 A | * 4/2002 | .......... A01M/29/00 |

* cited by examiner

Primary Examiner—Darren W. Ark
(74) Attorney, Agent, or Firm—Eric Karich

(57) ABSTRACT

A bird repelling device has an elongate housing having a slide chamber that extends longitudinally from a top end to a bottom end of the elongate housing. The elongate housing also has a cap positioned adjacent to the top end of the slide chamber. A plurality of rod apertures extend through the cap. The bird repelling device also includes a slide mechanism that is adapted to slidably engage the slide chamber to slide between a retracted position and an extended position. A plurality of bird repelling rods are each attached to the slide mechanism and extend through one of the plurality of rod apertures. The bird repelling device also includes top and bottom attachment loops for attaching the bird repelling device to a halyard of a mast.

15 Claims, 3 Drawing Sheets

BIRD REPELLING DEVICE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to bird repelling devices, and more particularly to a bird repelling device that includes an elongate housing and a slide mechanism that enable a plurality of bird repelling rods to move between a retracted position and an extended position.

2. Description of Related Art

The following art defines the present state of this field:

Gregg, III, U.S. Pat. No. 5,974,998, teaches an upstanding post that includes a plurality of rods extending laterally from a top end of the apparatus in radial relation to the longitudinal axis of the post.

Costa, Sr., U.S. Pat. No. 5,615,524, teaches a bird roosting guard that includes a plurality of spikes that are adapted to be attached to the top of the mast and the spreader to prevent birds from roosting thereupon.

Chatten, U.S. Pat. No. 5,181,338, teaches a bird deterrent device that includes a plurality of projecting members that are attached in a co-planar arrangement to deter birds from roosting adjacent the device. The projecting members are constructed to move erratically in the wind, and to not support the weight of a bird.

The above-described references are hereby incorporated by reference in full.

The prior art teaches various devices that can be used to repel birds. However, the prior art does not teach a bird repelling device that includes the structures and benefits described herein. The present invention fullfills these needs and provides further related advantages as described in the following summary.

SUMMARY OF THE INVENTION

The present invention teaches certain benefits in construction and use which give rise to the objectives described below.

The present invention provides a bird repelling device for preventing birds from landing on a surface. The bird repelling device has an elongate housing having a slide chamber that extends longitudinally from a top end to a bottom end of the elongate housing. The bird repelling device also includes a slide mechanism that is adapted to slidably engage the slide chamber to slide between a retracted position and an extended position. A plurality of bird repelling rods are positioned within the slide chamber and attached to the slide mechanism such that the plurality of bird repelling rods extend out of the top end when the slide mechanism is in the extended position. The bird repelling device also includes a means for positioning the elongate housing adjacent the surface.

A primary objective of the present invention is to provide a bird repelling device having advantages not taught by the prior art.

Another objective is to provide a bird repelling device that can be stored in a retracted position in which the plurality of bird repelling rods are protected within the elongate housing.

Another objective is to provide a bird repelling device that includes a plurality of bird repelling rods that extend upwardly and bend outwardly under the influence of a weighted bulb at a terminal end of each of the plurality of bird repelling rods.

A further objective is to provide a bird repelling device that can be attached to a halyard and hoisted up a mast to prevent birds from landing thereupon, the bird repelling device being also loosely linked to a downhaul line that is attached to the halyard so that the force of pulling down the halyard using the downhaul line is transmitted directly to the halyard and not through the bird repelling device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a bird repelling device 10 for preventing birds from landing on a surface 12.

Figure 1:
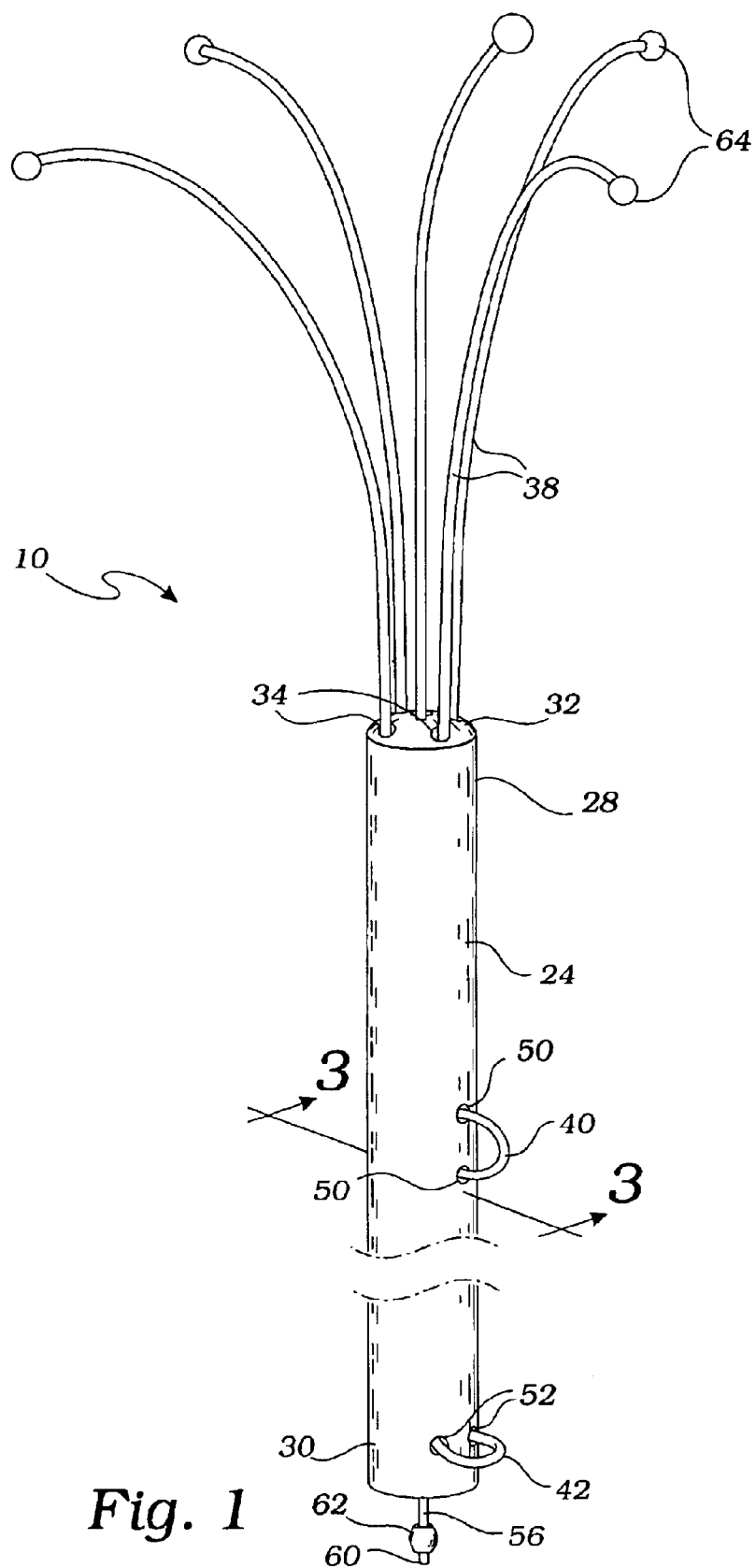
FIG. 1 is a perspective view of the preferred embodiment of the present invention, a bird repelling device.
Figure 2:
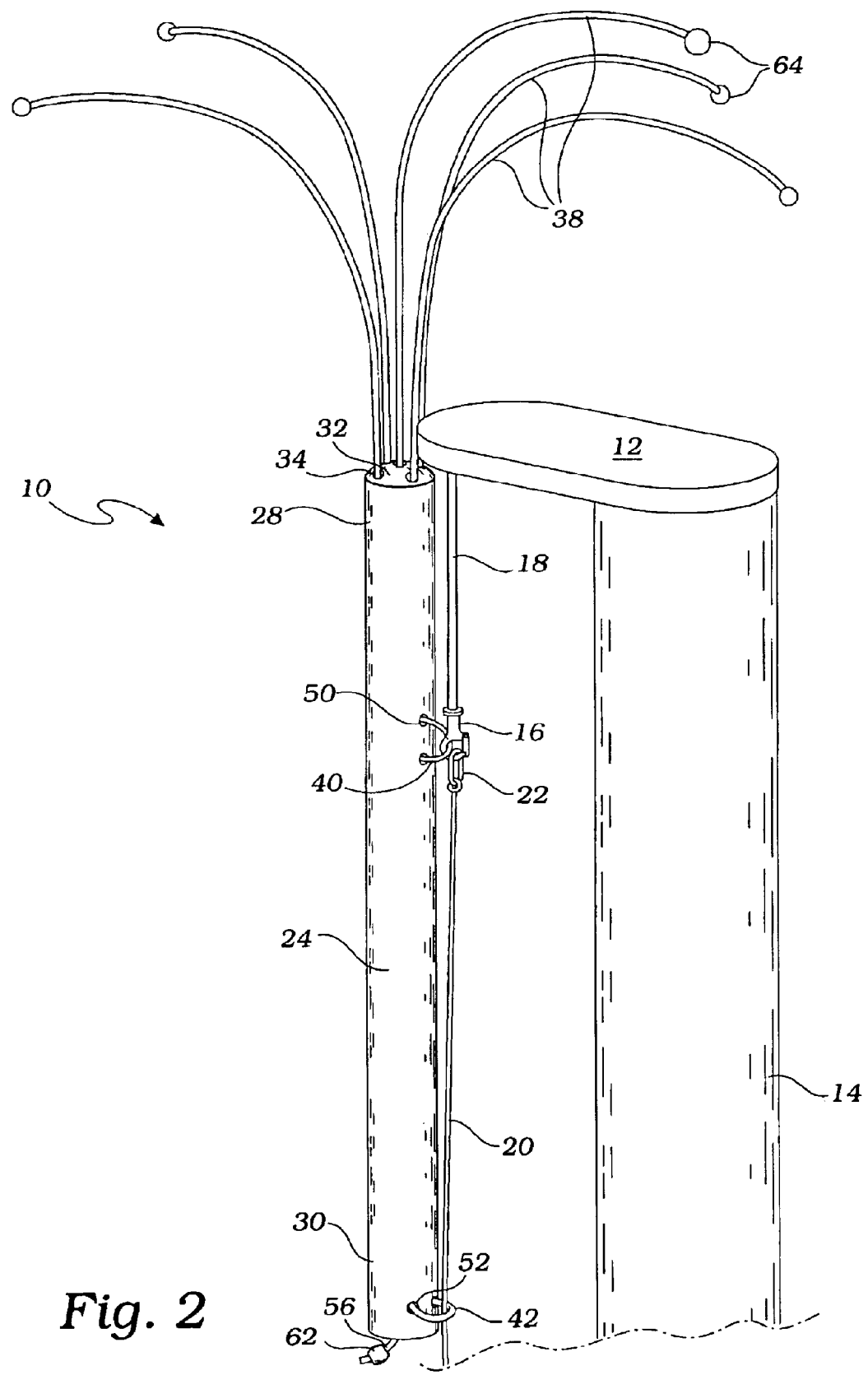
FIG. 2 is a perspective view thereof illustrating how the bird repelling device is attached to a halyard and hoisted to a top of a mast.

As shown in FIGS. 1 and 2, the bird repelling device 10 has an elongate housing 24 that contains a plurality of bird repelling rods 38 that are useful for repelling birds. The bird repelling device 10 includes a means for attaching the elongate housing 24 to a halyard 18 so that the plurality of bird repelling rods 38 are operably positioned in proximity to the surface 12.

In one embodiment, as shown in FIG. 2, the bird repelling device 10 is particularly adapted for mounting on a mast 14 of a sailboat (not shown). In this embodiment, the means for attaching preferably includes a means for removably attaching the elongate housing 24 to a clip 16 of a halyard 18. The means for removably attaching may include a top attachment loop 40 and a bottom attachment loop 42. The top attachment loop 40 is positioned generally towards the top end 28. The bottom attachment loop 42 is positioned generally towards the bottom end 30. In this embodiment, the clip 16 is removably attached to the top attachment loop 40. A downhaul line 20 is threaded through the bottom attachment loop 42 and attached to the clip 16, preferably with a downhaul ring 22, although an alternative structure or a simple knot could also be used. In this embodiment, it is preferred that the downhaul line 20 be directly linked the halyard 18, excluding the bird repelling device 10, so that the downward force of the downhaul line 20 is transmitted directly to the halyard 18, and is not transmitted through the top attachment loop 40, the bottom attachment loop 42, or the elongate housing 24. In this embodiment, the halyard 18 is used to raise the elongate housing 24 to a position adjacent to the top of the mast 14. In this position, the plurality of bird repelling rods 38 extend over the surface 12 at the top of the mast 14 and prevent birds from roosting thereupon.

Figure 3:
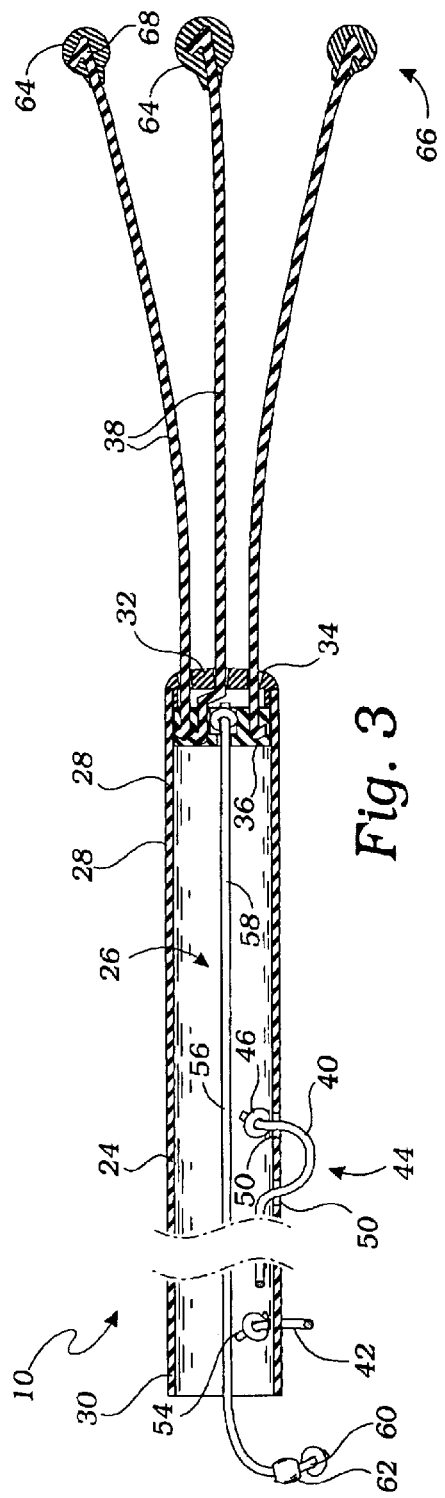
FIG. 3 is a sectional view thereof taken along line 3—3 in FIG. 1, illustrating the bird repelling device in an extended position.

As shown in FIG. 3, the top and bottom attachment loops 40 and 42 may be formed from a single length of rope 44 or similar strand. The rope 44 includes a top knot 46, extends to bridge a pair of top apertures 50, and then extends down to bridge a pair of bottom apertures 52, where the rope 44 ends in a bottom knot 54. Of course, those skilled in the art can devise alternative embodiments. The top and bottom attachment loops 40 and 42 may be formed from two separate ropes or strands. Alternative embodiments also include the use of rigid plastic or metal rings that can be fastened to the elongate housing 24, an integral ring or similar aperture, or any other mechanisms that enable the attachment of the halyard 18 as described.

In alternative embodiments, not shown, the means for positioning the bird repelling device 10 may include a variety of attachment mechanisms, bases, or any other form of placement to position the plurality of bird repelling rods 38 adjacent any surface 12, thereby preventing birds resting upon the surface 12. For example, the bird repelling device 10 may include a sturdy base (not shown) that allows the elongate housing 24 to be positioned adjacent any generally flat surface, such as the deck of a sailboat (not shown). The base (not shown) may be in the form of a tripod, a broad, skid-proof rubber surface, or other configuration that can be devised by those skilled in the art. The elongate housing 24 may also include attachment mechanisms, clips, brackets, or similar mechanisms (not shown) that can be used to hang, mount, position, or otherwise locate or arrange the bird repelling device 10 adjacent a surface that may attract birds. It is understood that those skilled in the art can devise countless alternative uses for the bird repelling device 10, and easily adapt attachment means that are suitable for a particular use. These alternative embodiments, while not explicitly shown herein, should be considered within the scope of the invention as claimed below.

Figure 4:
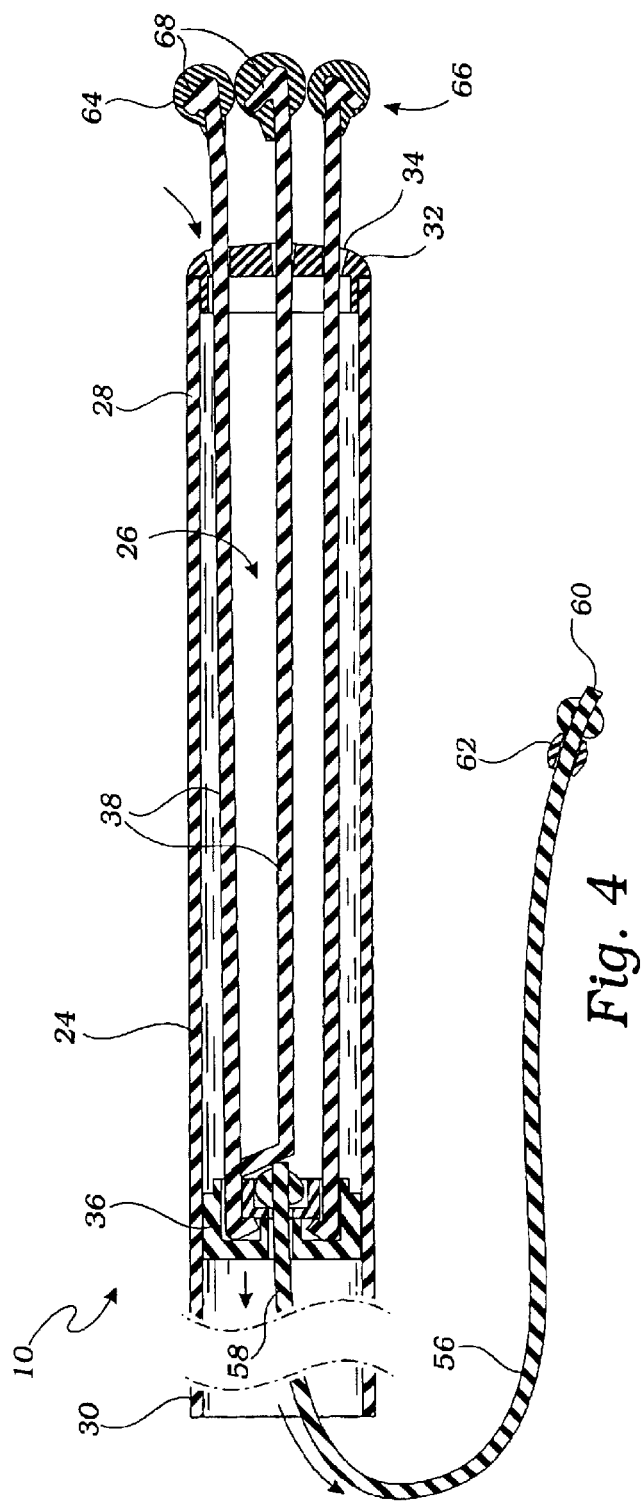
FIG. 4 is a sectional view thereof illustrating the bird repelling device in a retracted position.

As shown in FIGS. 3 and 4, the elongate housing 24 has a slide chamber 26 that extends longitudinally from a top end 28 to a bottom end 30 of the elongate housing 24. The elongate housing 24 is preferably generally cylindrically shaped and preferably includes a cap 32 that is positioned generally adjacent to the top end 28 of the slide chamber 26. The cap 32 is preferably positioned to seal the top end 28 of the elongate housing 24 and includes a plurality of rod apertures 34.

The cap 32 is useful for correctly positioning the plurality of bird repelling rods 38, and for containing the slide mechanism 36 within the slide chamber 26, it is not necessarily required for the function of the invention. For example, the slide mechanism 36 could be contained within the slide chamber 26 with other features, such as a bead 62, described below, if it were large enough, or a ridge (not shown) within the slide chamber 26 that would block the upward movement of the slide mechanism 36.

The slide mechanism 36 is adapted to slidably engage the slide chamber 26 to slide between an extended position, shown in FIG. 3, and a retracted position, shown in FIG. 4. The plurality of bird repelling rods 38 are attached to the slide mechanism 36 so that their position is controlled by the position of the slide mechanism 36. In the extended position, as shown in FIG. 3, the slide mechanism 36 is positioned at the top end 28 of the elongate housing 24, near the cap 32. When the slide mechanism 36 is in the extended position, a substantial part of each of the plurality of bird repelling rods 38 extends out of the top end 28 of the slide chamber 26, above the elongate housing 24. The plurality of bird repelling rods 38 are thereby operably positioned to repel birds.

When the bird repelling device 10 is not in use, the slide mechanism 36 is moved from the extended position to the retracted position, as shown in FIG. 4. When the slide mechanism 36 is moved to the retracted position, the plurality of bird repelling rods 38 are adapted to be positioned substantially within the slide chamber 26, so that only terminal ends 66 of the plurality of bird repelling rods 38 extend through the plurality of rod apertures 34. In this position, the plurality of bird repelling rods 38 are positioned almost entirely within the elongate housing 24 and are therefore protected from damage. This position facilitates shipment and storage of the bird repelling device 10.

As shown in FIGS. 3 and 4, the slide mechanism 36 preferably includes a pull rope 56 that can be used to pull the slide mechanism 36 from the extended position to the retracted position. The pull rope 56 includes a first end 58 that is attached to the slide mechanism 36, and a second end 60 that is adapted to be grasped by the user. The second end 60 preferably includes a bead 62 that facilitates the user grasping and pulling on the bottom end 30. It is possible to omit this element, however, and control the position of the slide mechanism 36 by pushing or pulling on the plurality of bird repelling rods 38. It is also possible to replace this element with an alternative structure, not shown, such as a pin extending from an alternative slide mechanism that extends through a longitudinal slot though an alternative elongate housing. These and alternative structures should be considered within the scope of the claimed invention.

As shown in FIGS. 3 and 4, each of the plurality of bird repelling rods 38 preferably include a weighted bulb 64 at the terminal end 66. The terminal end 66 of each of the plurality of bird repelling rods 38 includes a crimped portion 68, and the weighted bulb 64 is molded over the crimped portion 68. The weighted bulb 64 is preferably heavy enough to overcome the resilience of one of the plurality of bird repelling rods 38 so that the one of the plurality of bird repelling rods 38 bends to form a curve. The plurality of bird repelling rods 38 function best in the present embodiment when they are bent to a curve that extends a distance horizontally.

It is not necessary that the plurality of bird repelling rods 38 curve, as in the present embodiment. In alternative embodiments, the weighted bulbs 64 are merely lightweight elements that are ornamental and/or function to prevent the bird repelling rods 38 from sliding entirely through the rod apertures 34 of the cap 32 and into the elongate housing 24.

The plurality of bird repelling rods 38 are preferably constructed of a flexible, weather resistant, and corrosion resistant material, such as aluminum, plastic, or other suitable material. The elongate housing 24 is preferably constructed of a durable, light weight plastic or other suitable material that would be weather resistant and corrosion resistant. The weighted bulbs 64 at the terminal ends 66 of the plurality of bird repelling rods 38 would preferably be constructed of a plastic or rubber material or other similar material, preferably a material that can be injection molded onto the terminal ends 66 of the plurality of bird repelling rods 38. The plurality of bird repelling rods 38 are preferably constructed of stainless steel, aluminum, plastic, or similar resilient material.

The invention includes a method for preventing birds from landing on a surface 12 using the bird repelling device 10 described above. The bird repelling device 10 is initially provided in a retracted position for shipment and/or storage. In this position, the plurality of bird repelling rods 38 are positioned substantially within the slide chamber 26. When the bird repelling device 10 is ready for use, the slide mechanism 36 is moved to the extended position such that each of the plurality of bird repelling rods 38 extend substantially out of the slide chamber 26, above the elongate housing 24. The bird repelling device 10 is then positioned so that the plurality of bird repelling rods 38 are operably positioned in proximity to the surface 12.

In the embodiment shown in FIG. 2, the bird repelling device 10 is attached to the clip 16 of the halyard 18, preferably using the top attachment loop 40. The downhaul line 20 is then threaded through the bottom attachment loop 42 and attached to the clip 16, preferably with the downhaul ring 22. The halyard 18 is then used to raise the elongate housing 24 to a position adjacent to the top of the mast 14 so that the plurality of bird repelling rods 38 extend over the surface 12 at the top of the mast 14 and prevent birds from roosting thereupon. When the sailboat is ready for use, the downhaul line 20 is used to haul the halyard 18 and the bird repelling device 10 back down so that the bird repelling device 10 can be returned to the retracted position and stored for future use.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A bird repelling device for preventing birds from landing on a surface, the bird repelling device comprising:
   an elongate housing having a slide chamber that extends longitudinally from a top end to a bottom end of the elongate housing;
   a slide mechanism adapted to slidably engage within the slide chamber to slide between an extended position and a retracted position;
   a plurality of bird repelling rods positioned within the slide chamber and extend out of the top end when the slide mechanism is in the extended position; and
   a means for attaching the elongate housing to a halyard so that the plurality of bird repelling rods are operably positioned in proximity to the surface, the means for attaching including at least one attachment loop.

2. The bird repelling device of claim 1 wherein the at least one attachment loop includes a top attachment loop and a bottom attachment loop, the top and bottom attachment loops being attached to the elongate housing.

3. The bird repelling device of claim 1 further comprising a plurality of weighted bulbs, each of the plurality of weighted bulbs being mounted on a terminal end of one of the plurality of bird repelling rods.

4. The bird repelling device of claim 3 wherein the terminal end of each of the plurality of bird repelling rods includes a crimped portion, and wherein each of the plurality of weighted bulbs is molded over the crimped portion.

5. The bird repelling device of claim 3 wherein each of the plurality of weighted bulbs is heavy enough to overcome the resilience of one of the plurality of bird repelling rods so that the one of the plurality of bird repelling rods bends to form a curve.

6. The bird repelling device of claim 1 further comprising a pull rope attached to the slide mechanism and extending out of the bottom end of the elongate housing.

7. The bird repelling device of claim 1 further comprising:
   a cap positioned generally adjacent to the top end of the elongate housing; and
   a plurality of rod apertures through the cap, each of the plurality of bird repelling rods extending through one of the plurality of rod apertures.

8. A bird repelling device for preventing birds from landing on a surface, the bird repelling device comprising:
   an elongate housing having a slide chamber that extends longitudinally from a top end to a bottom end of the elongate housing;
   a cap positioned adjacent to the top end of the elongate housing;
   a plurality of rod apertures through the cap;
   a slide mechanism adapted to slidably engage the slide chamber to slide between an extended position and a retracted position;
   a plurality of bird repelling rods attached to the slide mechanism,
   the plurality of bird repelling rods being positioned substantially within the slide chamber so that only terminal ends of the plurality of bird repelling rods extend through the plurality of rod apertures when the slide mechanism is in the retracted position,
   each of the plurality of bird repelling rods being pushed substantially out of the slide chamber to extend above the elongate housing when the slide mechanism moves to the extended position; and
   a means for attaching the elongate housing to a halyard so that the plurality of bird repelling rods are operably positioned in proximity to the surface, the means for attaching including at least one attachment loop.

9. The bird repelling device of claim 8 wherein the at least one attachment loop includes a top attachment loop and a bottom attachment loop, the top and bottom attachment loops being attached to the elongate housing.

10. The bird repelling device of claim 8 further comprising a plurality of weighted bulbs, each of the plurality of weighted bulbs being mounted on a one of the terminal ends of one of the plurality of bird repelling rods.

11. The bird repelling device of claim 10 wherein the terminal end of each of the plurality of bird repelling rods includes a crimped portion, and wherein each of the plurality of weighted bulbs is molded over the crimped portion.

12. The bird repelling device of claim 10 wherein each of the plurality of weighted bulbs is heavy enough to overcome the resilience of one of the plurality of bird repelling rods so that the one of the plurality of bird repelling rods bends to form a curve.

13. The bird repelling device of claim 8 further comprising a pull rope attached to the slide mechanism and extending out of the bottom end of the elongate housing.

14. A method for preventing birds from landing on a surface, the method comprising the steps of:
   providing a bird repelling device having an elongate housing having a slide chamber that extends longitudinally from a top end to a bottom end of the elongate housing, a slide mechanism adapted to slidably engage the slide chamber to slide between an extended position and a retracted position, and a plurality of bird repelling rods attached to the slide mechanism, the bird repelling device being stored in the retracted position such that the plurality of bird repelling rods are positioned substantially within the slide chamber;

moving the slide mechanism to the extended position such that each of the plurality of bird repelling rods extends substantially out of the top end of the elongate housing, above the elongate housing; and positioning the bird repelling device so that the plurality of bird repelling rods are operably positioned in proximity to the surface.

15. The method of claim 14 further comprising the steps of:

proving a mast having a halyard and a downhaul line;

attaching the bird repelling device to the halyard;

threading the downhaul line through a bottom attachment loop of the bird repelling device; and attaching the downhaul line to the halyard.

* * * * *